United States Patent
Lin et al.

(10) Patent No.: US 8,346,833 B2
(45) Date of Patent: Jan. 1, 2013

(54) FILTER AND METHOD FOR FILTERING

(75) Inventors: Guo Hui Lin, Beijing (CN); Yang Liu, Shanghai (CN); Lu Wan, Chengdu (CN); Min Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 11/870,488

(22) Filed: Oct. 11, 2007

(65) Prior Publication Data
US 2008/0244220 A1    Oct. 2, 2008

(30) Foreign Application Priority Data
Oct. 13, 2006 (CN) .......................... 2006 1 0136145

(51) Int. Cl.
*G06F 17/10* (2006.01)
(52) U.S. Cl. ...................................................... 708/300
(58) Field of Classification Search ........... 708/300–323
See application file for complete search history.

(56) References Cited

U.S. PATENT DOCUMENTS

| | | | |
|---|---|---|---|
| 5,600,582 A | 2/1997 | Miyaguchi | |
| 5,966,528 A | 10/1999 | Wilkinson et al. | |
| 6,058,405 A | 5/2000 | Kolte et al. | |
| 6,526,430 B1 | 2/2003 | Hung et al. | |
| 7,398,288 B2 * | 7/2008 | Gonikberg et al. | 708/300 |
| 2001/0054126 A1 | 12/2001 | Fukuda et al. | |
| 2004/0078403 A1 * | 4/2004 | Scheuermann et al. | 708/322 |
| 2004/0078549 A1 | 4/2004 | Tanaka et al. | |
| 2004/0126035 A1 | 7/2004 | Kyo | |
| 2004/0133617 A1 | 7/2004 | Chen et al. | |
| 2004/0267856 A1 | 12/2004 | Macy, Jr. | |
| 2011/0113082 A1 * | 5/2011 | Alimohammad et al. | 708/316 |

\* cited by examiner

*Primary Examiner* — Tan V. Mai
(74) *Attorney, Agent, or Firm* — Schmeiser, Olsen & Watts; John Pivnichny (57) ABSTRACT

A filter and method of filtering modifies the computation order to accommodate horizontal symmetric filtering, and modifies the source operands while modifying the single instruction multiple data (SIMD) computation, so as to eliminate such heavy overhead of transposing a pixel matrix. The filter and method of filtering reformats the equations involved in the prior art to the following equations, thereby acquiring the interpolation results by reducing the required clock cycles to three cycles:

$$acc = a0*(|p0+p5|p1+p6|p2+p7|p3+p8|)$$

$$acc = a1*(|p1+p4|p2+p5|p3+p6|p4+p7|) + acc$$

$$acc = a2*(|P2+P3|P3+P4|P4+P5|P5+P6|) + acc.$$

15 Claims, 8 Drawing Sheets

//6-tap symmetric horizontal filtering pseudo-codes:

```
#define    parm0 0x0001
#define    parm1 0xfffb
#define    parm2 0x0010
load       v14,*[address_of(pixel_0)]
load       v15,*[address_of(pixel_1)]
cir        acc0
symfilt_e acc0,v14,v15,parm0
symfilt_e acc0,v14,v15,parm1
symfilt_e acc0,v14,v15,parm2
```

//5-tap symmmetric horizontal filtering pseudo-codes:

```
#define    parm0 0x0001
#define    parm1 0xfffb
#define    parm2 0x0010
load       v14,*[address_of(pixel_0)]
load       v15,*[address_of(pixel_1)]
cir        acc0
symfilt_e  acc0,v14,v15,parm0
symfilt_e  acc0,v14,v15,parm1
symfilt_o  acc0,v14,v15,parm2
```

FIG. 8

FILTER AND METHOD FOR FILTERING

CROSS-REFERENCE TO RELATED APPLICATIONS

This application claims priority from China Patent Application Serial No. 200610136145.X filed on 13 Oct. 2006.

FIELD OF THE INVENTION

This invention relates generally to the field of filters and filtering methods, and more particularly to a self modifying apparatus and method accelerating symmetric or asymmetric filtering in single instruction multiple data (SIMD) processor.

BACKGROUND OF THE INVENTION

Nowadays, image display and audio-video data (generally referred to as content data) playback gradually turn to be the most popular application of the computing apparatus, and require higher and higher processing speed of the microprocessor.

Currently, Instruction-Level Parallelism architectures such as single instruction multiple data type (SIMD), multiple instruction multiple data type (MIMD), vector or array processing and so on are the dominant trends to increase the processing speed of the microprocessor. A vector machine applying parallel processing structure of SIMD processor can reduce computing time period while collectively processing a great amount of vector data such as image data composed of pixels, thus, vector machines applying SIMD processor are suitable for running image processing and video encoding/decoding applications which have heavy matrix computation loads.

In the field of image and audio-video processing, operations of transposing encoding and matrix transposing are commonly used technique of image and audio-video compressing and decompressing. Transposing matrix relates to rearranging the columns of a matrix into rows.

Figure 2:
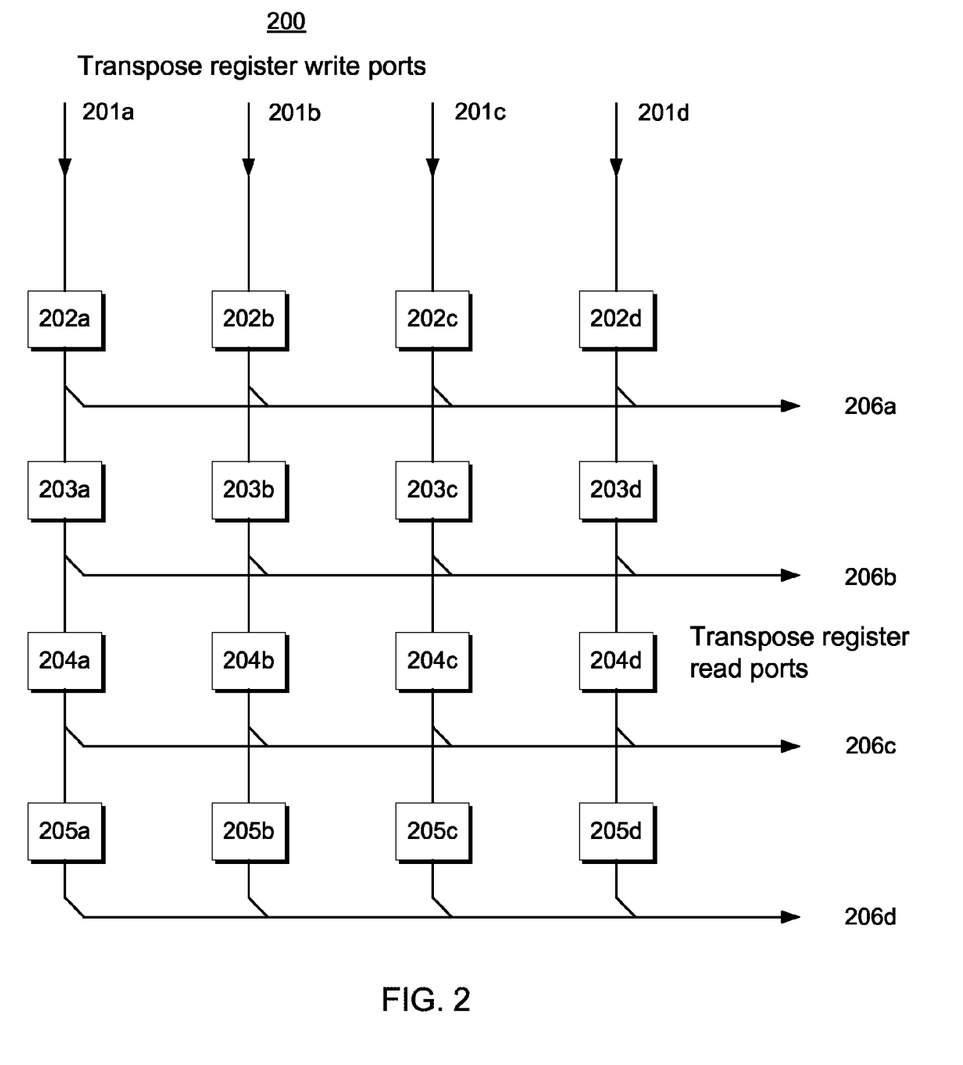
FIG. 2 shows a schematic diagram of standard transpose registers.

For vector machines, Vector transposing is usually carried out through transpose registers. These transpose registers are special register arrays which facilitate horizontal write-in and vertical read-out. As illustrated in FIG. 2, the data hold in the register array 200 is in row-first and column-second order. While reading those data out of the register array, special routing channels are used to read a vertical data column into a vector. Taking the FIG. 2 for example, initially, we write data [A0|A1|A2|A3], [B0|B1|B2|B3], [C0|C1|C2|C3], [D0|D1|D2|D3] into this transpose register from its write ports 201a, 201b, 201c, 201d. Then, data [A0,A1,A2,A3] are stored in the array cells denoted as 202a, 202b, 202c, 202d; data [B0,B1,B2,B3] are stored in the array cells denoted as 203a, 203b, 203c, 203d; data [C0,C1,C2,C3] are stored in the array cells denoted as 204a, 204b, 204c, 204d; data [D0,D1,D2,D3] are stored in the array cells denoted as 205a, 205b, 205c, 205d.

When reading operation is carried out, the vector data are read out from the read ports 206a, 206b, 206c, 206d. The data read out are organized in vertical direction in that the first vector data read out is formed by concatenating the contents in array cells 202a, 203a, 204a, 205a, i.e. the data read out [A0,B0,C0,D0] as shown in the drawing. Vector data [A1,B1,C1,D1], [A2,B2,C2,D2], [A3,B3,C3,D3] could be read out in the similar manner. The effect of write-in horizontally then read-out vertically from the transpose register array is equal to transposing a matrix. In this manner, vector computations can be performed in the above-mentioned manner of matrix transposing, no matter the matrix computation is in vertical or horizontal direction.

When matrix computation in vertical is desired, transposing a matrix involves N horizontal write operations and N vertical read operations (2×N cycles) to get a transposed N×N matrix. In more precise, to get a transposed 4×4 matrix, 4 horizontal vector write and 4 vertical vector read are necessary, which results in 8 cycles in total.

Figure 3:
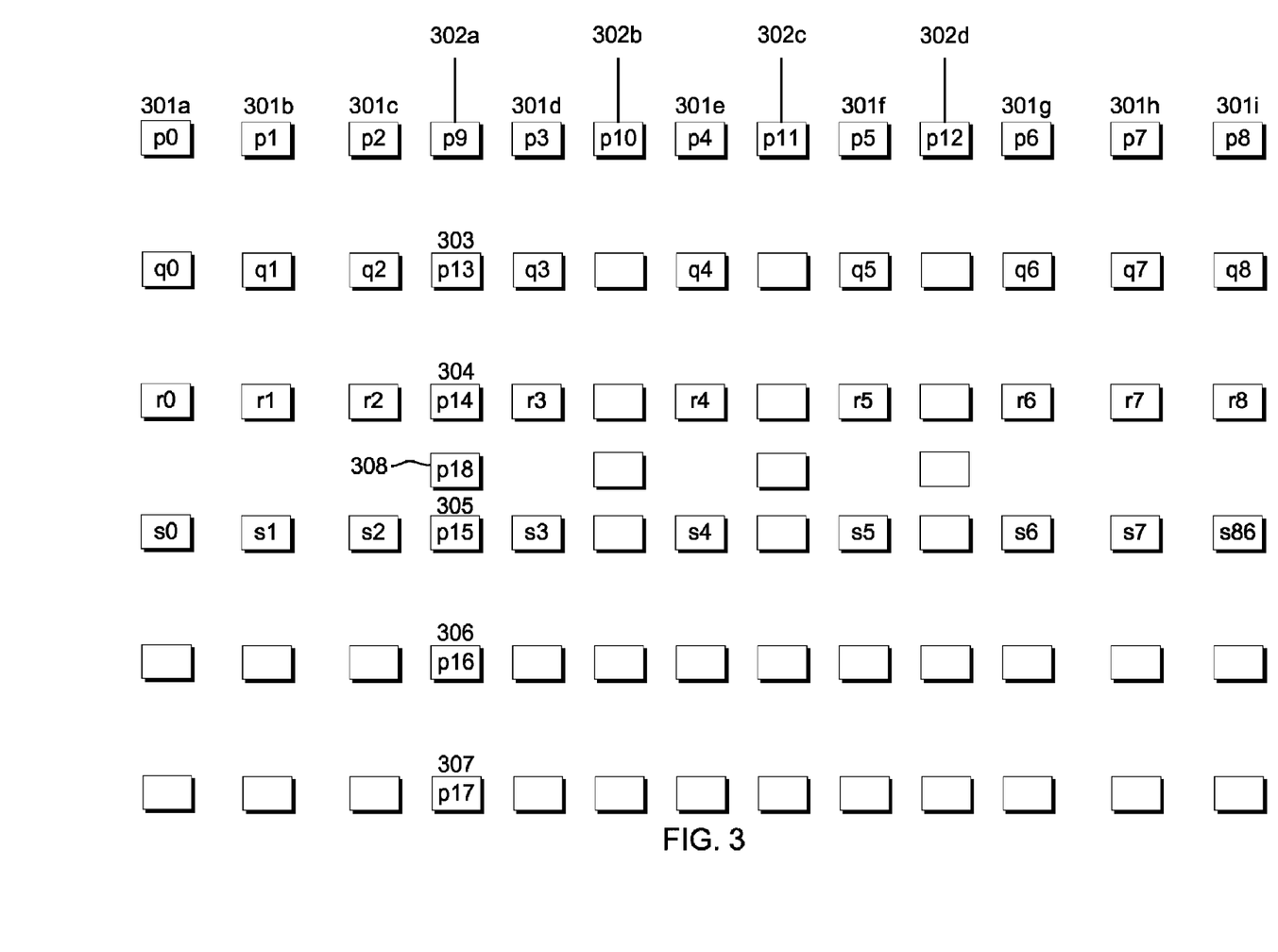
FIG. 3 shows a schematic operational diagram of the ideal 6-tap symmetric filtering in H.264.

However, for those algorithm kernels that is performance-critical such as 6-tap symmetric filtering in H.264 standard (i.e. advanced video coding for audio-video service), transposing a matrix before filtering algorithms could impose a heavy overhead on the algorithm efficiency. The desired H.264 symmetric filtering is illustrated in FIG. 3, each box represents a pixel in a displayed picture. For example, boxes denoted as 301a, 301b, 301c, 301d, 301e, 301f, 301g, 301h, 301i contain a array of reference pixels [p0,p1,p2,p3,p4,p5, p6,p7,p8]. A 6-tap symmetric filtering needs to obtain the predicted half-pixel array [p9,p10,p11,p12] contained in boxes 302a, 302b, 302c, 302d from the known pixels [p0,p1, p2,p3,p4,p5,p6,p7,p8,p9] by interpolating with following equations (1)-(4):

$$p9 = a0*p0 + a1*p1 + a2*p2 + a2*p3 + a1*p4 + a0*p5 \quad (1)$$

$$p10 = a0*p1 + a1*p2 + a2*p3 + a2*p4 + a1*p5 + a0*p6 \quad (2)$$

$$p11 = a0*p2 + a1*p3 + a2*p4 + a2*p5 + a1*p6 + a0*p7 \quad (3)$$

$$p12 = a0*p3 + a1*p4 + a2*p5 + a2*p6 + a1*p7 + a0*p8 \quad (4),$$

where p0-p8 are known pixels used as interpolation references and a0, a1, a2 are filtering coefficients. In H.264 standard, a0=1, a1=−5, a2=20; p9-p12 are the half pixels predicted from the 9 reference pixels p0-p8.

Normally, pixels p0-p8 are 8-bit words. Thus, each 64-bit vector register can hold 8 pixels. Assume that the contents in the eight 64-bit vector registers v0-v7 are:

$$v0 = [p0|p1|p2|p3|p4|p5|p6|p7]$$

$$v1 = [q0|q1|q2|q3|q4|q5|q6|q7]$$

$$v2 = [r0|r1|r2|r3|r4|r5|r6|r7]$$

$$v3 = [s0|s1|s2|s3|s4|s5|s6|s7]$$

$$v4 = [\ldots\ldots\ldots\ldots\ldots\ldots]$$

$$v5 = [\ldots\ldots\ldots\ldots\ldots\ldots]$$

$$v6 = [\ldots\ldots\ldots\ldots\ldots\ldots]$$

$$v7 = [\ldots\ldots\ldots\ldots\ldots\ldots]$$

Due to fact that the reference pixels p0-p8 are originally organized in horizontal manner, it is difficult to obtain half pixels p9, p10, p11, p12 by processing with SIMD (Single Instruction Multiple Data) instructions in parallel.

In order to exploit the parallelism, vertical half pixels p9, p13, p14, p15 as shown in FIG. 3 can be processed in parallel. But this necessitates transposing of a pixel matrix. With a matrix transposing, the contents in the eight 64-bit vector registers v0-v7 become:

$$v0' = [p0|q0|r0|s0|.|.|.|.|]$$

$$v1' = [p1|q1|r1|s1|.|.|.|.|]$$

$$v2' = [p2|q2|r2|s2|.|.|.|.|]$$

$$v3'=[p3|q3|r3|s3|..|..|..|..|]$$

$$v4'=[p4|q4|r4|s4|..|..|..|..|]$$

$$v5'=[p5|q5|r5|s5|..|..|..|..|]$$

$$v6'=[p6|q6|r6|s6|..|..|..|..|]$$

$$v7'=[p7|q7|r7|s7|..|..|..|..|]$$

Transposing the vector data from its original horizontal organization to vertical organization can facilitate the SIMD processing. Then half pixels p9, p13, p14, p15 can be calculated in parallel manner:

$$[p9|p13|p14|p15|] = a0*v0'+a1*v1'+a2*v2'+a2*v3'+a1*v4'+a0*v5'$$

That is to say, still taking FIG. 3 for example, p9, p13, p14, p15 are computed in the transposed matrix in the following manner:

$$p9=a0*p0+a1*p1+a2*p2+a2*p3+a1*p4+a0*p5$$

$$p13=a0*q0+a1*q1+a2*q2+a2*q3+a1*q4+a0*q5$$

$$p14=a0*r0+a1*r1+a2*r2+a2*r3+a1*r4+a0*r5$$

$$p15=a0*s0+a1*s1+a2*s2+a2*s3+a1*s4+a0*s5$$

However, transposing incurs quite a few extra instructions to transpose the matrix into desired formats. For example, it needs 2×N cycle overhead for transposing an N×N pixel matrix. Transposing a matrix before filtering algorithms could impose a heavy overhead on the algorithm efficiency. Thus, a new method which eliminates the 2×N transposing overhead for horizontal symmetric filtering is needed.

SUMMARY OF THE INVENTION

Briefly stated, a filter and method of filtering modifies the computation order to accommodate horizontal symmetric filtering, and modifies the source operands while modifying the SIMD computation, so as to eliminate such heavy overhead of transposing a pixel matrix. The filter and method of filtering reformats the equations involved in the prior art to the following equations, thereby acquiring the interpolation results by reducing the required clock cycles to three cycles:

$$acc=a0*(|p0+p5|p1+p6|p2+p7|p3+p8|)$$

$$acc=a1*(|p1+p4|p2+p5|p3+p6|p4+p7|)+acc$$

$$acc=a2*(|P2+P3|P3+P4|P4+P5|P5+P6|)+acc$$

According to an embodiment of the invention, a filter includes input means, for inputting source operands from a storage means; vector arithmetic logic means, for performing a filtering process on said source operands, to obtain m results of interpolation, where m is an integer not less than 1; a multiplex array, for shifting said source operands for self modification; and writeback means, for writing back said shifted and self-modified source operands to said storage means, for a next filtering process.

According to an embodiment of the invention, a filtering method includes the steps of (a) inputting source operands from a storage means, using input means; (b) performing a filtering process on said source operands, using vector arithmetic logic means; (c) shifting said input source operands for self modification, using multiplex array; (d) writing back said shifted and self-modified source operands to said storage means, using writeback means; and (e) repeating steps (a)-(d) until obtaining m results of interpolation, where m is an integer not less than 1.

According to an embodiment of the invention, a program product for executing SIMD instruction to obtain m results of interpolation through a predetermined time of filtering processes, where m is an integer not less than 1, the program product causes a computer system to execute the steps of: (a) inputting a first group of source operands and a second group of source operands to be subject to an interpolation process respectively from a first register and a second register, wherein the number of the source operands in the first group of source operands and in the second group of source operands is an integral larger than or equal to m; (b) using m vector arithmetic logic units to perform logic operations on left-most m source operands in the first group of source operands and right-most m source operands in the second group of source operands, respectively, and storing the m operation results respectively in m intermediate vector registers; (c) using m parallel multiply accumulators to respectively multiply the operation results from said m intermediate vector registers with the specified filtering coefficients, and respectively adding the obtained products respectively with the results already stored in m accumulator registers, and storing the above added results in m accumulator registers; (d) using two multiplex arrays to shift left the first group of source operands and fill the rightmost data of the first group of source operands with zero, and shift right the second group of source operands and fill the leftmost data of the second group of source operands with zero, thereby effecting a self-modification on the source operands, and enable the shifted first group of source operands and the shifted second group of source operands to be the source operands subject to the next filtering process; (e) using writeback means to write back said shifted first group and second group of source operands to the first register and second register, and (f) repeating steps (a)-(e) until obtaining m results of interpolation in the m accumulator registers.

In view of the problem in the prior art that the processing efficiency of widthwise interpolation operation is very low since the data organization of its source operands are not suitable for the conventional SIMD structure processing, and with respect to the problem that transposing a matrix before horizontal filtering algorithms could impose a heavy overhead on the algorithm efficiency, the present invention provides a filtering method, an apparatus, and a computer program which can reduce 2×N cycle overhead in horizontal symmetric filtering and improve the encoding/decoding efficiency, so that it can reach an efficiency similar to that of vertical (lengthwise) interpolating while performing horizontal interpolating.

Preferably, the present invention provides a filter with symmetric filtering coefficients, to execute a SIMD instruction to perform a predetermined times of filtering processes to obtain m results of interpolation, where m is an integer not less than 1, the filter includes: input means, for inputting a first group of source operands and a second group of source operands to be subject to an interpolation process respectively from a first register and a second register, the number of the source operands in the first group of source operands and in the second group of source operands is an integral larger than or equal to m, vector arithmetic logic means, comprising: m vector arithmetic logic units for performing logic operations on left-most m source operands in the first group of source operands and right-most m source operands in the second group of source operands, respectively; m intermediate vector registers for storing the operation results of said m vector arithmetic logic units, respectively; m parallel multiply accumulators for respectively multiplying the operation results from said m intermediate vector registers with specified filtering coefficients, and respectively adding the obtained products with the results already stored in m accumulator registers; and the m accumulator registers for respectively storing the above added results, two multiplex arrays for shifting left the first group of source operands and filling the rightmost data of the first group of source operands with zero, and shifting right the second group of source operands and filling the leftmost data of the second group of source operands with zero, thereby effecting a self-modification on the source operands, and enabling the shifted and self-modified first group of source operands and the shifted and self-modified second group of source operands to be the source operands subject to the next filtering process, and writeback means for writing back said shifted first group and second group of source operands to the first register and second register, respectively, for a next filtering process.

Here, "symmetric filter coefficients" means the tap coefficients are symmetric between each other in the case of even-tap, while the filtering coefficients other than the center tap are symmetric between each other in the case of odd-tap. In the case of an even-tap symmetric filtering process, the number of the predetermined time of filtering processes is half of the tap number. In the case of an odd-tap symmetric filtering process, the number of the predetermined time of filtering processes is half of "the tap number plus 1", and using said multiplex arrays to replace the second group of source operands with 0, and writing back the second group of source operands which are all 0 to a second register, before the last filtering process. For example, when m is 1 and n is 2, the filter of the present invention realizes 3-tap filtering, which obtains m (i.e. 1) interpolated result after 2 cycles. As long as n≧m≧1 is satisfied, the value of m and n are not limited to be the above example.

Theoretically, the filter of the present invention can also be applied in 2-tap filtering. In this case, n can even be equal to m, and the desired interpolated result is obtained upon completing one cycle of processing, the writeback means need no work. Thus, in order to efficiently utilizing the writeback means of the present invention, n is preferably an integer larger than m.

The present invention proposes to modify the computation order to accommodate horizontal symmetric filtering, and modify source operands while modifying the SIMD computation.

First: modify source operands to accommodate horizontal symmetric filtering. While the horizontal symmetric filtering is performing as shown in FIG. 3, those horizontal reference pixels 301a-301i are not organized in a conventional way for SIMD machine due to the reason that the SIMD operation is only good at performing vector processing for vertically organized data. Therefore, a mechanism is needed to select appropriate data from the horizontally organized data to make the vector ALU engines perform computation. In the self-modifying mechanism proposed in this invention, the two source operands will be self-modified by shifting to left and right according to algorithm needs simultaneously with computational flow in SIMD ALUs.

Second: modify the computation order. As stated in the previous description of the background art, equations (1), (2), (3) and (4) for performing 6-tap symmetric filtering are not suitable to be implemented directly in a SIMD machine. Direct implementation of horizontal symmetric filtering involves heavy overhead of transposing a pixel matrix. In order to exploit the full utilization of the vector adders/multipliers/accumulators in a SIMD vector processor, the present invention proposes to reformat the above-mentioned equations (1), (2), (3) and (4) to make better use of the existing SIMD ALUs (Arithmetic Logical Units).

For example, when performing 6-tap symmetric filtering process in H.264 standard video encoding/decoding, 4 interpolated results are obtained in the accumulator registers by performing three filtering processes with predetermined filtering coefficients of a0, a1, a2 respectively on the first group of source operands p0, p1, p2, p3, p4, p5, p6, p7 and the second group of source operands p1, p2, p3, p4, p5, p6, p7, p8:

$$acc = a0 * (|p0+p5|p1+p6|p2+p7|p3+p8|) \tag{5}$$

$$acc = a1 * (|p1+p4|p2+p5|p3+p6|p4+p7|) + acc \tag{6}$$

$$acc = a2 * (|p2+p3|p3+p4|p4+p5|p5+p6|) + acc \tag{7}$$

The differences between the new equations (5), (6) and (7) and their original forms in equations (1), (2), (3) and (4) mainly lie in that:

1) In the equations (5), (6) and (7), the addition operations are done prior to those multiplication operations. While in equations (1), (2), (3) and (4), the computation order is first multiplication then followed by addition; and 2) Those multiplications in equations (1), (2), (3) and (4) who share the common filtering coefficients are grouped together in the new equations (5), (6) and (7) to be executed in SIMD multipliers.

DETAILED DESCRIPTION OF THE PREFERRED EMBODIMENT

Specifically, the following description is given with reference to H.264 video encoding/decoding. However, the embodiments of the present invention are not limited by this, and can be applied in filtering in general signal processing, image processing and audio-video encoding/decoding. For example, the present invention can be used with other kinds of standard operations for video encoding (for example, MPEG-4, AVS, and so on).

Outline of the Processor

Figure 1:
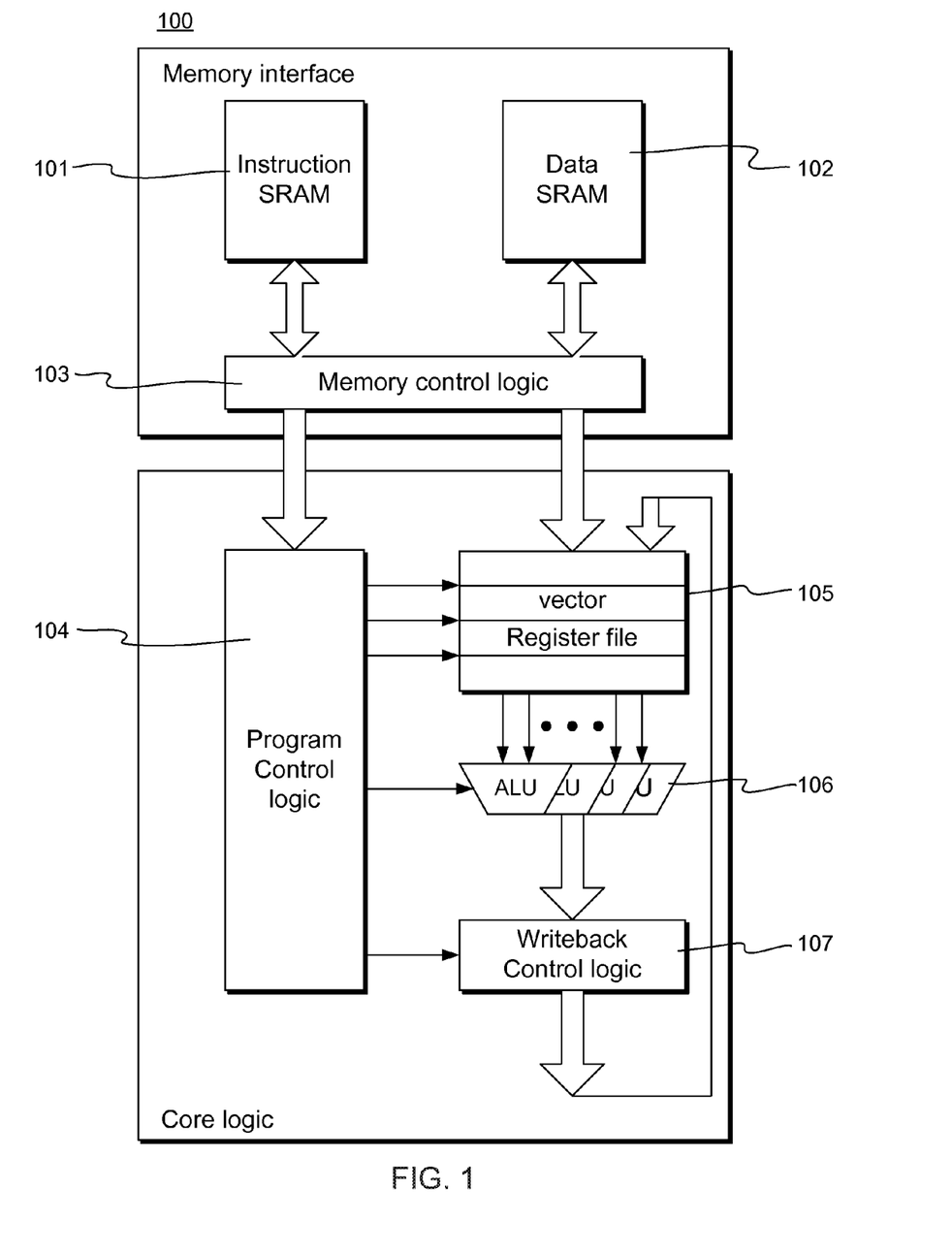
FIG. 1 shows a block diagram of SIMD vector machine architecture.

FIG. 1 shows the SIMD vector machine architecture with parallel processing structure for performing vector computation. SIMD means an operation on multiple data flow by instruction in signal instruction flow.

SIMD vector machines 100 are suitable for running video encode/decode applications which have heavy matrix computation loads. In general, a vector machine 100 consists of processor core logic and memory interface logic as shown in FIG. 1.

Memory interface module normally has two SRAM blocks. One is instruction SRAM module 101 for storing instructions and the other is data SRAM module 102 used to store data. Memory control logic 103 which is shown in the upper part of FIG. 1 is used for feeding instructions to the program control logic 104 and data to the vector register file 105.

Processor core logic usually has:

1. Program control logic 104 which is responsible for generating control signals and supervising the functions of other parts in the processor;

2. Vector ALUs (Arithmetic Logical Units) 106 used to do vector addition/subtraction/multiplication, etc;

3. Vector registers file 105 used to interface between SRAM and ALUs; and

4. Writeback logic 107 which is responsible for generating writeback control signals according to predefined masks which permits certain lanes to be writeback and inhibits the other lanes from writing back.

The improvement of the present invention lies in the processor core logic in the SIMD vector machine. A novel self-modifying SIMD processor consisting of program control logic, vector registers, vector arithmetic logical units and writeback logic is proposed as an interpolation filter, which can reduce 2×N cycle overhead of transposing in parallel symmetric filtering and improve the encoding/decoding efficiency.

Embodiment 1

Figure 4:
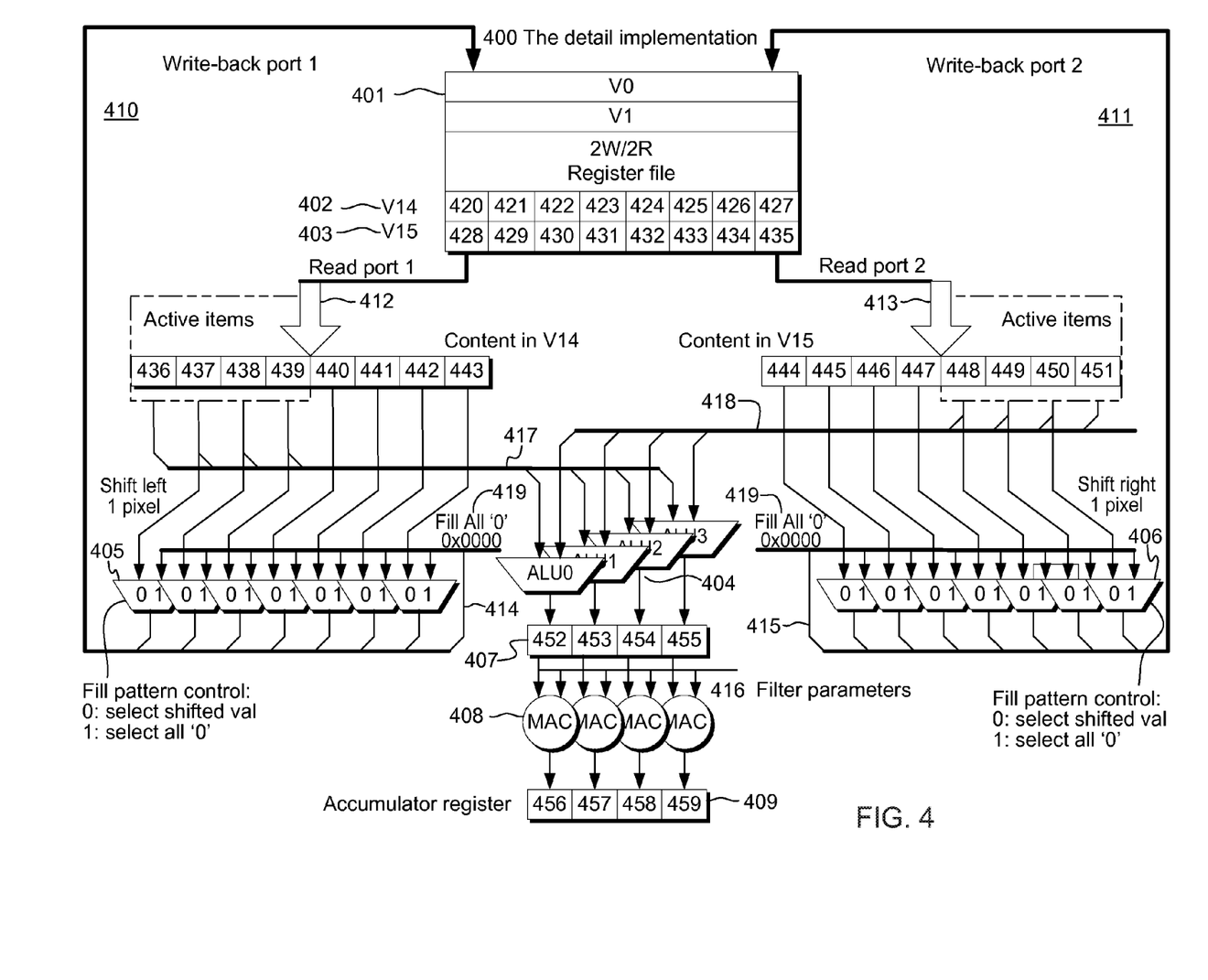
FIG. 4 shows the self-modifying SIMD datapath for horizontal symmetric filtering according to the embodiment 1 of the present invention.

FIG. 4 shows the self-modifying SIMD datapath for horizontal symmetric filtering according to the embodiment 1 of the present invention. In this embodiment, a 2-port write and 2-port read register array is used as an example to describe the self-modifying SIMD processor of the present invention. The self-modifying SIMD processor includes a 2-port write and 2-port read register array 401, from which the content data in the two vector registers va and vb (a first group of content data and a second group of content data) are read out at a time.

In this embodiment, each vector register can contain 8 pixels; a vector arithmetic logic means including four vector arithmetic logic units (ALU) 404 respectively for performing logic operations on the four valid content data from the vector register va and the four corresponding valid content data from the vector register vb; four intermediate vector registers 407 respectively for storing the operation results in ALU 404; four parallel multiply accumulator (MAC) 408 respectively for multiplying the content data in the above four intermediate vector registers 407 with a specified filtering coefficient 416, and then adding the respective products with the content data in the four accumulator registers 409; and four accumulator registers 409 respectively for storing the above addition result, two multiplex (MUX) array 405, 406 respectively for shifting the content data form vector register va and vb for self modification, so that the shifted first and second group of content data are suitable for the next filtering process, in the hardware structure as shown in FIG. 4, MUX array 405, 406 shift left the content data in vector register va by one bit and fill the rightmost content data in vector register va with zero, with the leftmost content data in vector register va before shifting is abandoned (rejected) after shifting, and shift right content data in vector register vb by one bit and fill the leftmost content data in vector register vb with zero, with the rightmost content data in vector register vb before shifting is abandoned (rejected) after shifting; writeback logic (writeback means) respectively for writing back the self-modified content data in vector register va and vb to the register array 401, for a next filtering process; and program control logic for performing the respective logic functions of the above core processors.

It should be understood that the numbers of vector arithmetic logic units, intermediate vector registers, parallel multiply accumulator and accumulator registers are not limited as "four", and should be adapted to the number of the interpolated result to be finally obtained. That is to say, the number of the interpolated result to be obtained is decided based on the number of inputted source operands and the number of the filtering taps, and the numbers of these vector arithmetic logic units, intermediate vector registers, parallel multiply accumulator and accumulator registers are equal to the number of the interpolated result to be obtained.

The self-modifying SIMD processor of the present invention can be applied to accelerate even-tap and odd-tap symmetric filtering, preferably horizontal symmetric filtering. The detailed instruction is described as follow:

(a) symfilt_e acc,va,vb,parm - - - Instruction for even-tap symmetric filtering; and (b) symfilt_o acc,va,vb,parm - - -Instruction for odd-tap symmetric filtering;

where the symfilt_e instruction is used in even-tap symmetric filtering; the symfilt_o instruction is used in odd-tap symmetric filtering; acc is the destination accumulator register which holds the results; va and vb are two vector registers providing filtering sources, and are used to hold the source operands involved in interpolating, wherein the source operands means the sample values at different times in audio filtering and refers to the pixel data in different position in image such as image in video applications; and parm is the immediate data specifying the filtering coefficients. In previous H.264 6-tap filtering example, the values of the parm field can be 1, −5, 20.

The execution of these instructions with the self-modifying SIMD processor of the present invention involves following actions:

1. data stored in two source vector registers (va denoted as 402 and vb denoted as 403 in FIG. 4 are read from vector register array 401. Here we assume vector register va is v14 and vector register vb is v15 for clarity.

2. The content data of v14 and v15 are respectively routed from the register array (40)'s two read ports 1 and 2 to two inputs 417, 418 of the vector ALUs 404 including ALU0-ALU3 according to the predefined pattern:

Word 436, 448 are connected to ALU0 as its two inputs: ALU0(436,448)

Word 437, 449 are connected to ALU1 as its two inputs: ALU1(437,449)

Word 438, 450 are connected to ALU2 as its two inputs: ALU2(438,450)

Word 439, 451 are connected to ALU3 as its two inputs: ALU3(439,451)

Taking ALU0 for example, the leftmost word 436 on input bus 412 is connected to ALU0 as its one input and the fifth word 448 from the other input bus 413 is also connected to ALU0 as its second input.

3. Vector ALU0-ALU3 denoted as 404 perform arithmetic or logic operations (for example, addition operation herein) on the content data from inputs 417 and 418, then store the operation results to an intermediate vector register 407 for temporary storage for next operation.

4. The content data on read bus 412 and 413 are self-modified through two multiplex (MUX) arrays 405, 406 to reshape to certain specified formats. The specified format for symmetric filtering is to:
(a) shift the content data on read port 1 (input bus 412) by one pixel width to the left;
(b) shift the content data on read port 2 (input bus 413) by one pixel width to the right;
(c) fill the rightmost pixel 443 on input bus 412 with zero by the hardwired line 414; and
(d) fill the leftmost pixel 444 on input bus 413 with zero by the hardwired line 415.

Then the reformatted content data are written back to register array 401 through two writeback lanes 410, 411.

5. The data (452,453,454,456) in the intermediate register 407 are then respectively entered into a dedicated datapath which consists of 4 parallel Multiply Accumulator (MAC) (408).

6. The content data in data 452,453,454,456 in the intermediate register 407 are firstly multiplied with a specified filtering coefficient 416 which is specified in the inline parm field in the instruction word, then are added with the content data in accumulator registers 456,457,458,459, finally the results are stored in the accumulator register 409 consisting of accumulator registers 456,457,458,459 to update the content data originally in the accumulator register 409.

Embodiment 2

In the up to date video encoding standard H.264/AVC, the precision of movement prediction achieves ¼ pixel. In order to improve the speed of movement prediction, it is also desired to realize SIMD parallel operation of movement prediction. The greatest problem lies in that the conventional storage manner of reference image with ¼ pixel precision is not suitable to parallel operation. The above self-modifying SIMD processor proposed in the present invention realizes SIMD parallel operation of movement prediction, the time consumed in the whole movement prediction process is reduced by accelerating even-tap and odd-tap horizontal symmetric filtering.

Figure 5:
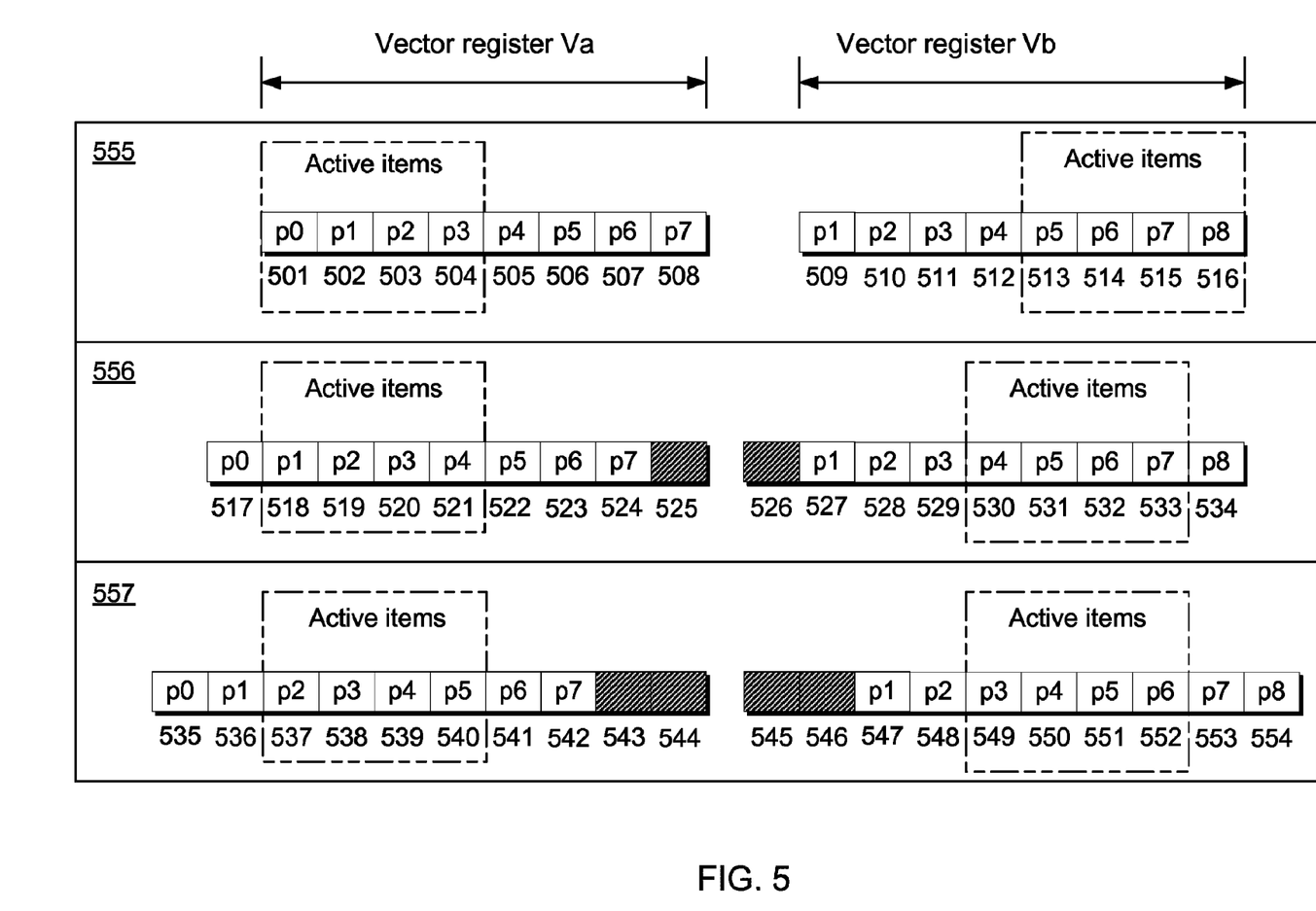
FIG. 5 shows the contents in registers va and vb in execution for even-tap symmetric filtering according to the embodiment 2 of the present invention.

Now, taking the 6-tap (horizontal symmetric) filtering in H.264 for example, we describe how the self-modifying mechanism of the present invention realizes symmetric filtering, in combination with the hardware architecture shown in FIG. 4 and the register content shown in FIG. 5.

Assume the pixels are 8-bit in precision and the vector registers are 64-bit in width. One vector register can contain 8 pixels. It can be conceived that the bit number of pixels and the size of vector register used in the present invention are not limited as 8-bit and 64-bit. Obviously, 6-bit pixel can also be applied in the present invention, and the size of the vector register can be adjusted accordingly based on the bit number and amount of pixels to be processed.

The vector register file is designed as a 2-port write and 2-port read (2 read 2 write) register array as shown in FIG. 4. Before the symmetric filtering could begin, reference pixels [p0,p1,p2,p3,p4,p5,p6,p7] and [p1,p2,p3,p4,p5,p6,p7,p8] are initially loaded into register file (501-518) as depicted in FIG. 5.

The content data of register va are read out from read port 1, i.e., p0-p7 as shown in first cycle processing 555 of FIG. 5; and the contents of register vb are read out from the other read port, i.e., p1-p8 as shown in FIG. 5. As shown in FIG. 5, the left-most 4 pixels [p0,p1,p2,p3] at position 501-504 read out from the register va and the 4 right-most pixels [p5,p6,p7,p8] at position 513-516 read out from the register vb are selected and routed to the 4 vector ALUs (ALUs 404 in FIG. 4) for summing up. Therefore, in the next cycle denoted as c1, we will get in the temporary register 452-455 the results from [p0+p5|p1+p6|p2+p7|p3+p8].

Figure 6:
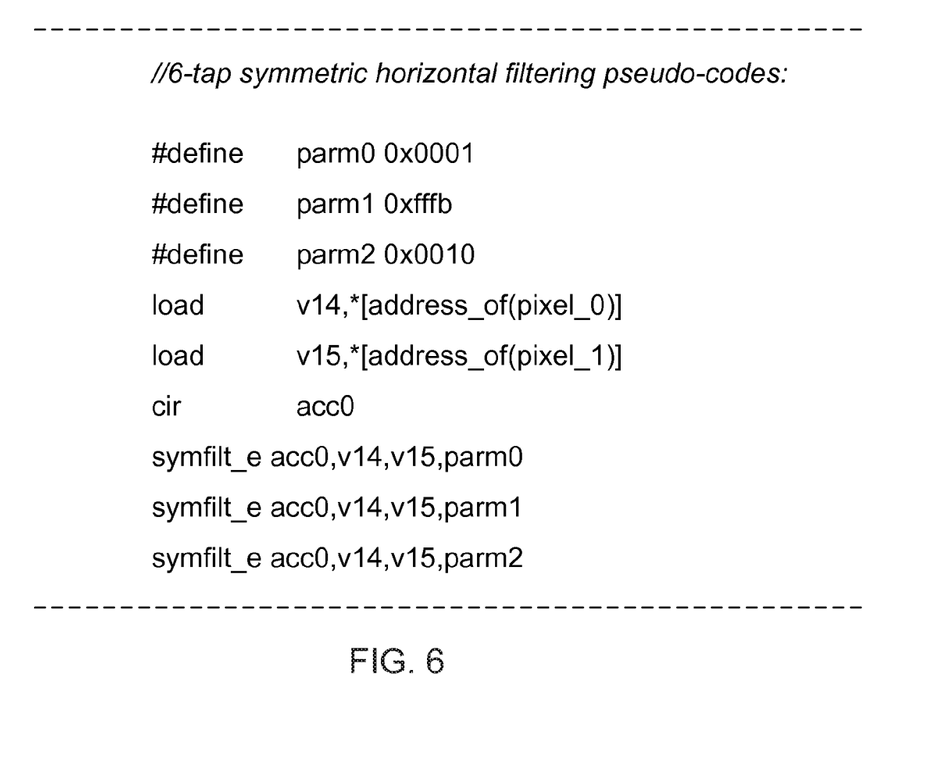
FIG. 6 shows the pseudo-code for even-tap symmetric filtering with horizontally organized data according to the embodiment 2 of the present invention.

Then on the next cycle c2, the results in temporary register 452-455 will be first multiplied by an inline parameter 416 specified in parm field (for the H.264 standard example, the first parm is 1). Then, the result from the multiplication is added to the accumulator registers 456-459 that have been initialized to zero by prior instruction "clr acc0" (FIG. 6). After the first symfilt_e instruction is executed, the results of equation (5) are acquired in the accumulator register:

$$acc = a0 * (|p0+p5|p1+p6|p2+p7|p3+p8|) \quad (5)$$

In the first cycle of c1, the content data on the read port 1 and read port 2 are shifted left and right by one pixel width respectively. To be more precise, in the example of 6-tap (horizontal symmetric) filtering of H.264, through the MUX array 405, 406, on the va side, pixels [p1,p2,p3,p4,p5,p6,p7,0] (as shown at positions from 518 to 525 in the second cycle 556 as shown in FIG. 5) are selected by the MUX array 405 and then routed to the write-back port 1 (via writeback lane 410), wherein pixel p0 is rejected by shifting operation and is no longer stored. On the vb side, [0,p1,p2,p3,p4,p5,p6,p7] (as shown at positions from 526 to 533 in the second cycle 556 as shown in FIG. 5) are selected by the MUX array 406 and routed to write-back port 2 (via writeback channel 411), wherein pixel p8 is rejected by shifting operation and is no longer stored.

Then these shifted values will be writebacked to va and vb when vector register array write operation is triggered on the next cycle C2. After the execution of the first symfilt_e instruction, registers va and vb are now holding the shifted pixel values. As shown at the second cycle 556 in FIG. 5, the second symfilt_e instruction will read pixels [p1,p2,p3,p4] (at positions 518-521 in register va) and [p4,p5,p6,p7] (at positions 530-533 in register vb) in read port 1 (input bus 412) and read port 2 (input bus 413) respectively. In this manner, after the second symfilt_e instruction is executed, the results of equation (6) are acquired in the accumulator register:

$$acc = a1 * (|p1+p4|p2+p5|p3+p6|p4+p7|) + acc \quad (6)$$

Similarly, when the third symfilt_e instruction is executed, the data on read port 1 and read port 2 become [p2,p3,p4,p5] (at position 537-540 in register va) and [p3,p4,p5,p6] (at position 549-553 in register vb) respectively. After the third symfilt_e instruction is executed, the results of equation (7) are acquired in the accumulator register:

$$acc = a2 * (|p2+p3|p3+p4|p4+p5|p5+p6|) + acc \quad (7)$$

By shifting the content data in register va to the left by one pixel and shifting the content data in vb to the right by one pixel, the source operands are organized suitable for operations in equation (5), (6) and (7). In this way, 8 reference pixels (in their original form in the vector register without any additional data reorganization) can be directly fed into the SIMD ALUs. Therefore, the overhead caused by the additional data reorganization of the horizontally organized data are mitigated.

In FIG. 6, the reference code is given for even-tap (6-tap, for example) symmetric filtering operation with horizontal source data (6-tap symmetric horizontal filtering pseudo-codes).

First, "#define parm0 0x0001", "#define parm1 0xfffb" and "#define parm2 0x0010" are respectively used to define symmetrical filtering coefficients, in the H.264 6-tap filtering example, the values of parm field are respectively 1, −5, 20; then, "load v14,*[address_of(pixel_0)]" and "load v15,*[address_of(pixel_1)]" are respectively used to load 8 consecutive pixels starting from pixel p0 to v14 and load 8 consecutive pixels starting from pixel p1 to v15; subsequently, "clr acc0" clears accumulator to all zero; next, "symfilt_e acc0, v14,v15,parm0", "symfilt_e acc0,v14,v15,parm1" and "symfilt_e acc0,v14,v15,parm2" perform the first, the second and the third round filterings.

Then, when vertical 6-tap filtering is continuously performed to acquire a pixel movement vector precision of half pixel, since the data organization with its source operands being vertical interpolated is suitable for conventional SIMD structure, it is convenient to process with SIMD. For example, the predicted pixel p18 (pixel contained in box 308 in FIG. 3) can be generated from its vertical neighboring pixels p9, p13, p14, p15, p16, p17 (302*a*, 303, 304, 305, 206, 307): p18=a0*p9+a1*p13+a2*p14+a2*p15+a1*p16+a0*p17 (in H.264 standard, a0=1, a1=−5, a2=20). In embodiment 2, pixel 18 in FIG. 3 is obtained by loading the result of widthwise interpolating from the accumulator register (ACC) 409 in FIG. 4 to the vector register array 401 in FIG. 4, and completing vertical interpolating with conventional SIMD multiplication instruction. Similarly, the three pixels on the same line as pixel 18 and to the right of pixel 18 can all be generated from their respective 6 vertical neighboring pixels. Thus, the vertical symmetric filter will not be described in detail in the embodiment 2 of the present invention.

With embodiment 2 of the present invention, the sampling value at the position of the whole pixel and the half pixel can be further averaged to obtain a predicted value at the position of one fourth pixel, which improves the movement predicted precision so that the movement vector can be as precise as ¼ pixel level in movement compensation.

It should be understood that the embodiment 2 of the present invention can be applied in 8-tap horizontal symmetric filtering. As compared with 6-tap filtering, the specific operation of 8-tap horizontal symmetric filtering needs only to add one cycle of process to perform interpolating operation with a fourth filtering coefficients. Thus it can be seen that the embodiment 2 of the present invention can be applied in any other even-tap filtering process with symmetric tap coefficients, as long as the computation does not go beyond the numeral scope of the parallel multiply accumulator (MAC).

Embodiment 3

Also, the self-modifying SIMD processor of the present invention can realize accelerating odd-tap symmetric filtering.

Figure 7:
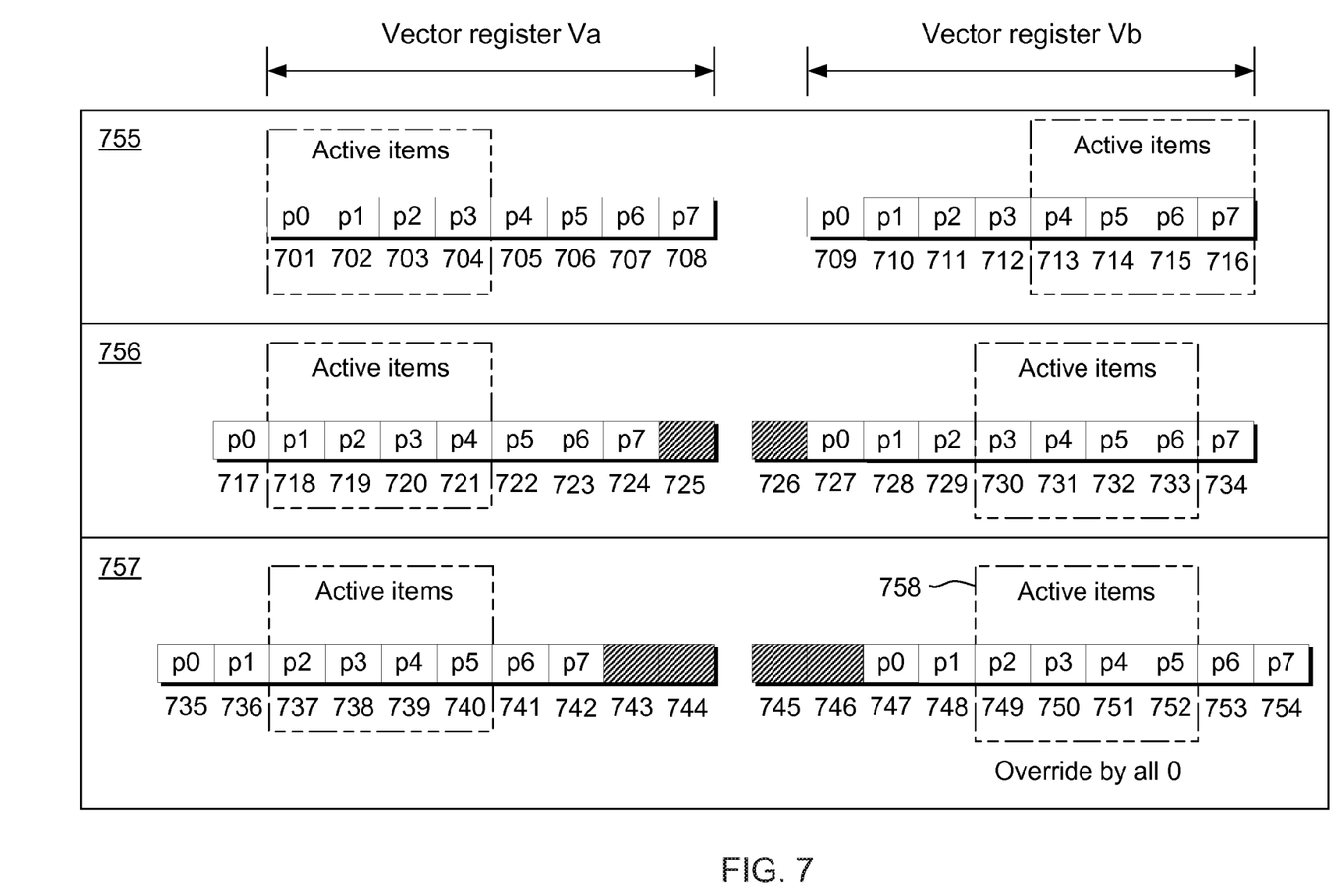
FIG. 7 shows the contents in registers va and vb in execution for odd-tap symmetric filtering according to the embodiment 3 of the present invention.

The odd-tap symmetric filtering operation is of little difference to the even tap symmetric filtering operation, as shown in FIG. 7, only the last step of calculation is different. Taking 5-tap symmetric filtering for example, the present invention proposes to calculate according to equations (8), (9) and (10):

$$acc=a0*(|p0+p4|p1+p5|p2+p6|p3+p7|) \quad (8)$$

$$acc=a1*(|p1+p3|p2+p4|p3+p5|p4+p6|)+acc \quad (9)$$

$$acc=a2*(|p2+0|p3+0|p4+0|p5+0)+acc \quad (10)$$

Thus, as compared with 6-tap symmetric filtering operations in (5), (6) and (7), the major difference is that half of the operands in the last step are replaced by zero (equation 10), whereby 5-tap symmetric filtering is realized.

For odd-tap symmetric filtering, hardware can also be the same as the hardware structure shown in FIG. 4.

In view of the changes of operands in 5-tap symmetric filtering (as shown in equations (8), (9) and (10)), the 5-tap symmetric filtering operation is almost the same as the even-tap symmetric filtering operation as shown in FIG. 6, except that: 1) the value in v15 (i.e. vb) is now loaded from memory starting from address of p0 as can be seen in FIG. 7 at 709, while in 6-tap filtering operation in FIG. 6, the first pixel loaded into v15 is not p0 but p1; 2) the last operation (i.e. the third cycle of process) of 5-tap symmetric filtering operation is an instruction to replace half of the operands by zero.

The instruction to replace half of the operands by zero is called as "symfilt_o". The only difference of instruction symfilt_o and symfilt_e is: in the case of symfilt_e, the shifted value (for example, pixels p3-p6 at positions 549-552 in the third cycle of process 577 as shown in FIG. 5) are routed to inputs of the SIMD ALUs to participate in the SIMD addition in the next cycle; while in the symfilt_o case, the shifted value (for example, values at positions 749-752 in the third cycle of process 757 as shown in FIG. 7) are replaced with '0' (as shown in equation 10) to participate in the SIMD addition in the next cycle. Thus, in the third cycle of process, the SIMD ALUs in symfilt_o become just a serial of selective lines in effect.

Figure 8:
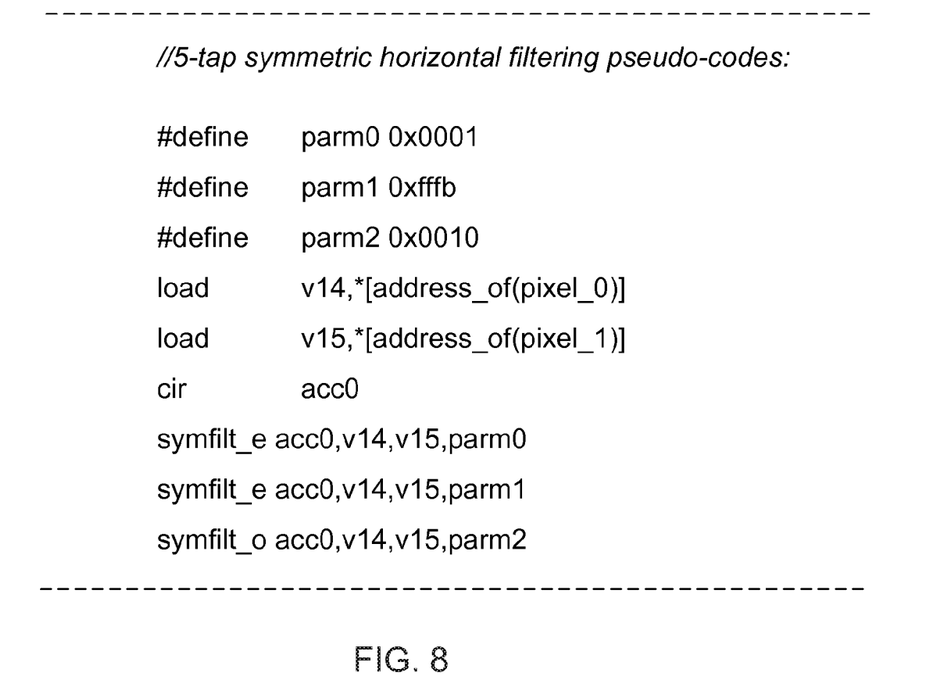
FIG. 8 shows the pseudo-code for odd-tap symmetric filtering with horizontally organized data according to the embodiment 3 of the present invention.

In FIG. 8, the reference code is given for odd-tap (5-tap, for example) symmetric filtering operation with horizontal source data (5-tap symmetric horizontal filtering pseudo-codes).

First, "#define parm0 0x0001", "#define parm1 0xfffb" and "#define parm2 0x0010" are respectively used to define symmetrical filtering coefficients, in the H.264 6-tap filtering example, the values of parm field are respectively 1, −5, 20; then, "load v14,*[address_of(pixel_0)]" and "load v15,*[address_of(pixel_1)]" are respectively used to load 8 consecutive pixels starting from pixel p0 to v14 and load 8 consecutive pixels starting from pixel p1 to v15; subsequently, "clr acc0" clears accumulator to all zero; next, "symfilt_e acc0, v14,v15,parm0", "symfilt_e acc0,v14,v15,parm1" and "symfilt_e acc0,v14,v15,parm2" perform the first, the second and the third round filtering.

Also, it should be understood that the embodiment 3 of the present invention can be applied in other odd-tap filtering process with symmetric tap coefficients, as long as the computation does not go beyond the numeral scope of the parallel multiply accumulator (MAC).

The above self-modifying mechanism for accelerating symmetric filtering in SIMD processor can be applied in image processing, audio-video encoding/decoding, and even normal signal processing. And its operation can be partially or completely realized by a processor system, micro controller, programmable logic device or micro processor. In addition, some of the operations can also be realized by software. The interconnected functional elements or software module for realizing these operations can be integrated into single logic device, program or operation. Also, the above apparatus and method are suitable for asymmetric filters or methods. Those skilled in the art can extend the present invention to an asymmetric filter and method by adding corresponding selecting logic and expand an instruction field to store another group of asymmetric coefficients according to the apparatus and method of the present invention, without any creative efforts.

While a method and a filter are mainly described in these embodiments, the present invention can also be carried out as a program or a program product available in the computer as apparent to those skilled in the art. Hence, the present invention can include an embodiment as hardware, an embodiment as software, or an embodiment of a combination of the software and the hardware. The program can be recorded on any arbitrary computer readable media, such as a hard disk, a CD-ROM, an optical storage unit, a magnetic storage unit, or the like.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A filter, comprising:
a storage unit comprising a first register and a second register, said first register comprising a first group of source operands, said second register comprising a second group of source operands;
vector arithmetic logic means for performing a filtering process on the first and second group of source operands to obtain m results of interpolation, said m being an integer not less than 1,
wherein the vector arithmetic logic means comprises:
m vector arithmetic logic units for performing logic operations on left-most m source operands in the first group of source operands and right-most m source operands in the second group of source operands to generate the m results, respectively;
m accumulator registers for storing m cumulative products, respectively; and
m parallel multiply accumulators for respectively multiplying the m results with specified filtering coefficients to generate m products, respectively, and for adding the m products to the m cumulative products previously stored in the m accumulator registers, respectively,
wherein the filter further comprises a first multiplex array and a second multiplex array;
wherein the first multiplex array is configured to shift left the first group of source operands and fill the rightmost data of the first group of source operands with zero, and the second multiplex array is configured to shift right the second group of source operands and fill the leftmost data of the second group of source operands with zero, thereby effecting a self-modification on the first and second groups of source operands, and enabling the shifted first group of source operands and the shifted second group of source operands to be the next first and second groups of source operands subject to a next filtering process; and
wherein the filter further comprises: (i) first writeback means for writing back the shifted and self-modified first group of source operands to the first register in preparation for the next filtering process and (ii) second writeback means for writing back the shifted and self-modified second group of source operands to the second register in preparation for the next filtering process.

2. The filter of claim 1, wherein the filtering coefficients of the filter are symmetric.

3. The filter of claim 2,
wherein said vector arithmetic logic unit performs adding operations on a source operand of the first group of source operands and corresponding source operand of the second group of source operands; and
wherein the filter executes a single instruction multiple data (SIMD) instruction to perform a predetermined number of filtering processes on said source operands arranged horizontally, to obtain m results of horizontal interpolation.

4. The filter of claim 3, said filter configured to execute an even-tap symmetric filtering, wherein the amount of the predetermined number of filtering processes is half of the tap number, to perform a 6-tap symmetric filtering process in H.264 standard video codec;
wherein the first group of source operands are p0,p1,p2,p3, p4,p5,p6,p7 representing 8 pixels;
wherein the second group of source operands are p1,p2,p3, p4,p5,p6,p7, p8 representing 8 pixels;
wherein three filtering processes are processed on the first group of source operands and the second group of source operands, in which the specified filtering coefficients are a0, a1 and a2, thereby obtaining results of interpolation in an accumulator register, using the equations $$acc=a0*(|p0+p5|p1+p6|p2+p7|p3+p8|)$$

$$acc=a1*(|p1+p4|p2+p5|p3+p6|p4+p7|)+acc$$

$$acc=a2*(|p2+p3|p3+p4|p4+p5|p5+p6|)+acc$$

wherein acc refers to the result held in the accumulator register.

5. The filter of claim 3, said filter configured to execute an odd-tap symmetric filtering, wherein a predetermined time of the filtering processes is half of the tap number plus 1.

6. The filter of claim 5, said filter configured to perform a 5-tap symmetric filtering process, wherein:
the first group of source operands are p0,p1,p2,p3,p4,p5, p6,p7 representing 8 pixels;
the second group of source operands are p0,p1,p2,p3,p4, p5,p6,p7 representing 8 pixels;
three filtering processes are processed on the first group of source operands and the second group of source operands, in which the specified filtering coefficients are a0, a1 and a2, thereby obtaining results of interpolation in an accumulator register using the equations $$acc=a0*(|p0+p4|p1+p5|p2+p6|p3+p7|)$$

$$acc=a1*(|p1+p3|p2+p4|p3+p5|p4+p6|)+acc$$

$$acc=a2*(|p2+0|p3+0|p4+0|p5+0|)+acc$$

wherein acc refers to the result held in the accumulator register.

7. The filter of claim 1, wherein m is at least 2.

8. A filtering method, said method comprising:
using vector arithmetic logic means, by a processor of a computer system, to perform logic operations on left-most m source operands in a first group of source operands and right-most m source operands in a second group of source operands to generate m results of interpolation, respectively, wherein the computer system comprises the vector arithmetic logic means, a first multiplex array and a second multiplex array, first writeback means and second writeback means, and a storage unit that includes a first register and a second register, said first register comprising the first group of source operands, said second register comprising the second group of source operands, wherein said using the vector arithmetic logic means comprises:
using m vector arithmetic logic units to perform logic operations on left-most m source operands in the first group of source operands and right-most m source operands in the second group of source operands to generate the m results, respectively, said m being an integer not less than 1;
using m accumulator registers to store m cumulative products, respectively; and
using m parallel multiply accumulators to respectively multiply the m results with specified filtering coefficients to generate m products, respectively, and to add the m products to the m cumulative products previously stored in the m accumulator registers, respectively;
said processor using the first multiplex arrays to shift left the first group of source operands and fill the rightmost data of the first group of source operands with zero and using the second multiplex arrays to shift right the second group of source operands and fill the leftmost data of the second group of source operands with zero, thereby effecting a self-modification on the first and second groups of source operands, and enabling the shifted first group of source operands and the shifted second group of source operands to be the next first and second groups of source operands subject to a next filtering process; and
said processor using the first writeback means to write back the shifted and self-modified first group of source operands to the first register in preparation for the next filtering process and using the second writeback means to write back the shifted and self-modified second group of source operands to the second register in preparation for the next filtering process.

9. The filtering method of claim 8, said method further comprising said processor performing a 6-tap symmetric filtering process in H.264 standard video codec, wherein:
the first group of source operands are p0,p1,p2,p3,p4,p5, p6,p7 representing 8 pixels;
the second group of source operands are p1,p2,p3,p4,p5, p6,p7, p8 representing 8 pixels;
three filtering processes are processed on the first group of source operands and the second group of source operands, in which the specified filtering coefficients are a0, a1 and a2, thereby obtaining results of interpolation in an accumulator register using the equations $$acc=a0*(|p0+p5|p1+p6|p2+p7|p3+p8|)$$

$$acc=a1*(|p1+p4|p2+p5|p3+p6|p4+p7|)+acc$$

$$acc=a2*(|p2+p3|p3+p4|p4+p5|p5+p6|)+acc$$

wherein acc refers to the result held in the accumulator register.

10. The filtering method of claim 8, said method further comprising said processor executing an odd-tap symmetric filtering, wherein a predetermined time of filtering processes is half of "the tap number plus 1", using two multiplex arrays to replace the second group of resource operands with 0, and writing back the second group of resource operands which are all 0 to a second register, before the last filtering process; and to perform a 5-tap symmetric filtering process in H.264 standard video codec, wherein:
the first group of source operands are p0,p1,p2,p3,p4,p5, p6,p7 representing 8 pixels;
the second group of source operands are p0,p1,p2,p3,p4, p5,p6,p7 representing 8 pixels; and
three filtering processes are processed on the first group of source operands and the second group of source operands, in which the specified filtering coefficients are a0, a1 and a2, thereby obtaining results of interpolation in an accumulator register using the equations $$acc=a0*(|p0+p4|p1+p5|p2+p6|p3+p7|)$$

$$acc=a1*(|p1+p3|p2+p4|p3+p5|p4+p6|)+acc$$

$$acc=a2*(|p2+0|p3+0|p4+0|p5+0|)+acc$$

wherein acc refers to the result held in the accumulator register.

11. The method of claim 8, wherein m is at least 2.

12. A program product comprising a storage device containing computer readable program code stored therein, said program code configured to be executed by a processor of a computer system to perform a filtering method, said method comprising:
said processor using vector arithmetic logic means to perform logic operations on left-most m source operands in a first group of source operands and right-most m source operands in a second group of source operands to generate m results of interpolation, respectively, wherein the computer system comprises the vector arithmetic logic means, a first multiplex array and a second multiplex array, first writeback means and second writeback means, and a storage unit that includes a first register and a second register, said first register comprising the first group of source operands, said second register comprising the second group of source operands, wherein said using the vector arithmetic logic means comprises:
using m vector arithmetic logic units to perform logic operations on left-most m source operands in the first group of source operands and right-most m source operands in the second group of source operands to generate the m results, respectively, respectively, said m being an integer not less than 1;
using m accumulator registers to store m cumulative products, respectively; and
using m parallel multiply accumulators to respectively multiply the m results with specified filtering coefficients to generate m products, respectively, and to add the m products to the m cumulative products previously stored in the m accumulator registers;
said processor using the first multiplex arrays to shift left the first group of source operands and fill the rightmost data of the first group of source operands with zero and using the second multiplex arrays to shift right the second group of source operands and fill the leftmost data of the second group of source operands with zero, thereby effecting a self-modification on the first and second groups of source operands, and enabling the shifted first group of source operands and the shifted second group of source operands to be the next first and second groups of source operands subject to a next filtering process; and
said processor using the first writeback means to write back the shifted and self-modified first group of source operands to the first register in preparation for the next filtering process and using the second writeback means to write back the shifted and self-modified second group of source operands to the second register in preparation for the next filtering process.

13. The program product of claim 12, said method further comprising said processor performing a 6-tap symmetric filtering process in H.264 standard video codec, wherein:
the first group of source operands are p0,p1,p2,p3,p4,p5, p6,p7 representing 8 pixels;

the second group of source operands are p1,p2,p3,p4,p5, p6,p7, p8 representing 8 pixels; and three filtering processes are processed on the first group of source operands and the second group of source operands, in which the specified filtering coefficients are a0, a1 and a2, thereby obtaining results of interpolation in an accumulator register using the equations $$acc=a0*(|p0+p5|p1+p6|p2+p7|p3+p8|)$$

$$acc=a1*(|p1+p4|p2+p5|p3+p6|p4+p7|)+acc$$

$$acc=a2*(|p2+p3|p3+p4|p4+p5|p5+p6|)+acc$$

wherein acc refers to the result held in the accumulator register.

14. The program product of claim 12, said method further comprising said processor performing a 5-tap symmetric filtering process in H.264 standard video codec, wherein:

the first group of source operands are p0,p1,p2,p3,p4,p5, p6,p7 representing 8 pixels;

the second group of source operands are p0,p1,p2,p3,p4, p5,p6,p7 representing 8 pixels; and three filtering processes are processed on the first group of source operands and the second group of source operands, in which the specified filtering coefficients are a0, a1 and a2, thereby obtaining results of interpolation in an accumulator register using the equations $$acc=a0*(|p0+p4|p1+p5|p2+p6|p3+p7|)$$

$$acc=a1*(|p1+p3|p2+p4|p3+p5|p4+p6|)+acc$$

$$acc=a2*(|p2+0|P3+0|p4+0|P5+0|)+acc$$

wherein acc refers to the result held in the accumulator register.

15. The program product of claim 12, wherein m is at least 2.

* * * * *